United States Patent [19]

Dix et al.

[11] Patent Number: 5,224,963
[45] Date of Patent: Jul. 6, 1993

[54] QUATERNIZED CONDENSATION PRODUCTS FOR AFTERTREATING DYED LEATHER

[75] Inventors: Johannes P. Dix, Weisenheim; Rolf Fikentscher; Ortwin Schaffer, both of Ludwigshafen; Rolf Streicher, Worms, all of Fed. Rep. of Germany

[73] Assignee: BASF Aktiengesellschaft, Ludwigshafen, Fed. Rep. of Germany

[21] Appl. No.: 655,841

[22] Filed: Feb. 14, 1991

[30] Foreign Application Priority Data

Mar. 3, 1990 [DE] Fed. Rep. of Germany ....... 4006647

[51] Int. Cl.$^5$ .................. C14C 11/00; D06P 5/02
[52] U.S. Cl. ..................... 8/94.21; 8/94.1 R; 8/94.2; 8/442; 8/490; 252/8.57
[58] Field of Search ............. 8/94.1 R, 442, 94.21, 8/436, 490, 94.2; 252/8.57

[56] References Cited

U.S. PATENT DOCUMENTS

| | | | |
|---|---|---|---|
| 1,923,178 | 8/1933 | Ulrich et al. | 8/436 |
| 2,257,239 | 9/1941 | Krzikalla et al. | 8/442 |
| 2,290,880 | 7/1942 | Katzman et al. | 252/8.57 |
| 3,790,606 | 2/1974 | Sellet | 252/8.57 |
| 4,615,709 | 10/1986 | Nakao | 8/599 |
| 4,797,131 | 1/1989 | Baumann | 8/436 |
| 4,931,065 | 6/1990 | Baumgarte et al. | 8/188 |
| 5,015,754 | 5/1991 | Dix et al. | 558/260 |

FOREIGN PATENT DOCUMENTS 223064 5/1987 European Pat. Off. .
3829974 3/1990 Fed. Rep. of Germany .

OTHER PUBLICATIONS

Bastamol K, Technical Information, TI/P 2601 d, BASF, Apr., 1989.

Primary Examiner—Prince Willis, Jr.
Assistant Examiner—Alan D. Diamond
Attorney, Agent, or Firm—Oblon, Spivak, McClelland, Maier & Neustadt

[57] ABSTRACT

Dyed leather is aftertreated with quaternized condensation products of

A) a precondensate of one or more trialkanolamines of the Formula I

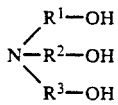

B)

a) a carboxylic acid derivative thereof IIa

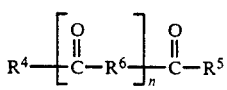

b) a carboxamide IIb

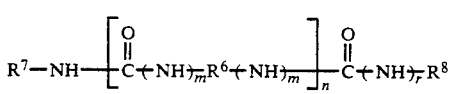

c) an epichlorohydrin IIc

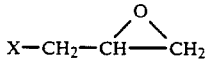

d) a monofunctional compound IId $R^9$—Y                                          IId e) a bifunctional compound IIe $Z^1$—$R^{10}$—$Z^2$                              IIe C) a benzyl halide III

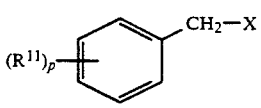

7 Claims, No Drawings

QUATERNIZED CONDENSATION PRODUCTS FOR AFTERTREATING DYED LEATHER

The present invention relates to a method of using quaternized condensation products of A) a precondensate of one or more trialkanolamines of the formula I

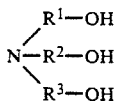

where $R^1$, $R^2$ and $R^3$ are each 1,2-alkylene of from 2 to 4 carbon atoms, and B) from 0 to 30 mol % per mole of I of one of the following compounds II:

a) a carboxylic acid or carboxylic acid derivative of the formula IIa

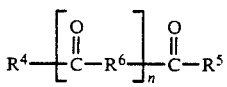

n is 0 or 1, $R^4$ and $R^5$ are hydroxyl, except if n is 0, or $C_1$-$C_8$-alkoxy, which may be joined together in the case of n=0 to form a five- or six-membered ring, or chlorine or bromine, and $R^6$ is alkylene of from 1 to 50 carbon atoms which may be interrupted by one or more nonadjacent oxygen atoms, b) a carboxamide of the formula IIb

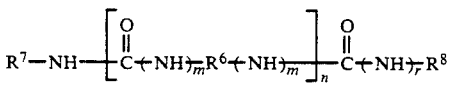

where m, n and r are each 0 or 1, $R^7$ is hydrogen or $C_1$-$C_4$-alkyl, and $R^8$ is hydrogen, $C_1$-$C_{25}$-alkyl, $C_2$-$C_{25}$-alkenyl, or phenyl which may be substituted by $C_1$-$C_4$-alkyl, $C_1$-$C_4$-alkoxy, fluorine, chlorine or by bromine, c) an epihalohydrin of the formula IIc

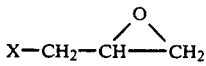

where X is chlorine or bromine, d) a monofunctional compound of the formula IId

where $R^9$ is $C_1$-$C_{25}$-alkyl, $C_2$-$C_{25}$-alkenyl, or phenyl which may be substituted by $C_1$-$C_4$-alkyl, $C_1$-$C_4$-alkoxy, fluorine, chlorine or by bromine, and Y is isocyanate or either of the groups

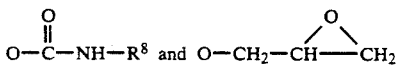

and e) a bifunctional compound of the formula IIe

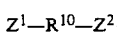

where $R^{10}$ is alkylene of from 1 to 50 carbon atoms which may be interrupted by one or more nonadjacent oxygen atoms or contain one or more nonvicinal hydroxyl groups, and $Z^1$ and $Z^2$ are each chlorine, bromine, isocyanate or one of the groups

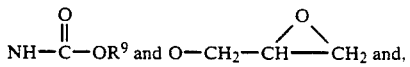

and

C) from 25 to 100 mol % per mole of I of benzyl halide of the formula III

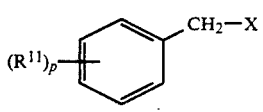

where p is from 0 to 2 and $R^{11}$ is $C_1$-$C_4$-alkyl, $C_1$-$C_4$-alkoxy, fluorine, chlorine or bromine, for aftertreating dyed leather.

Inadequate wet fastness properties, in particular a poor perspiration fastness, of, for example, upholstery leather, apparel leather and shoe leather constitute a still unresolved problem, since the detached dyes can stain textile materials or can pass into the human organism via the skin. It is true that dyed leather which has been treated with conventional fixatives such as urea-formaldehyde condensation products as described for example in the technical information leaflet TI/P 2601d Bastamol® K from BASF dated April 1989 (1), already has relatively high perspiration fastness properties, but these properties are still in need of improvement.

EP-A-223 064 (2) describes a process for after-treating reactive dyeings on cellulosic textile materials using, inter alia, cationic condensation products obtainable by heating triethanolamine and/or triisopropanolamine in the presence of acid catalysts and subsequent reaction with benzyl chloride.

Earlier German patent application P 38 29 974 (3) relates to quaternized condensation products formed from a trialkanolamine precondensate, a compound which modifies said precondensate, and a benzyl halide. These products are recommended for use as aftertreating agents for the fixation of reactive dyeings and prints on textile materials containing cellulose fibers.

It is an object of the present invention to improve the perspiration fastness of dyed leather to a significant degree.

We have found that this object is achieved by the method of using quaternized condensation products defined at the beginning.

These quaternized condensation products are known in principle from references (2) and (3). The precondensates used for their preparation can be obtained by heating a trialkanolamine I, in particular triethanolamine or triisopropanolamine $N[CH_2-CH(CH_3)-OH]_3$, in the presence of an acid catalyst, preferably phosphorous or hypophosphorous acid, at from 120° to 280° C, as described in reference (2).

However, departing from the process of (2), the reaction which leads to the incorporation of component II into the quaternized condensation product is advantageously discontinued, by cooling, at distinctly below the gel point on reaching a viscosity region of from 5,000 to 35,000 mPa.s, preferably from 10,000 to 25,000 mPa.s, in the case of triethanolamine or from 100,000 to 600,000 mPa.s, preferably from 200,000 to 500,000 mPa.s, in the case of triisopropanolamine or from 100,000 to 250,000 mPa.s in the case of a cocondensate of preferably equimolar amounts of triethanolamine and triisopropanolamine (measured in each case in the undiluted state at 20° C.).

If no component II is used, the trialkanolamine condensate should have a viscosity of at least 40,000 mPa.s in the case of triethanolamine, 800,000 mPa.s in the case of triisopropanolamine or 300,000 mPa.s in the case of a cocondensate of preferably equimolar amounts of triethanolamine and triisopropanolamine.

For further crosslinking and/or to incorporate a group of a different polarity into the chains which carry the alcohol functions, the condensates obtained can be reacted with one or more compounds IIa to IIe with or without quaternization at the central nitrogen atoms. The quaternized condensation products which contain components IIa to IIe are preferred to those without these components. The amount of compound II is within the range from 0 to 30 mol %, preferably from 1 to 30 mol %, in particular from 1 to 15 mol %, per mole of I.

Suitable compounds IIa to IIe are:

A) the defined carboxylic acids or their derivatives IIa in which case $R^4$ and $R^5$ are each hydroxyl, $C_1$-$C_8$-alkoxy, preferably $C_1$-$C_4$-alkoxy, chlorine or bromine, and the bridge member $R^6$ is in particular the group

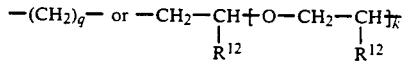

where q can be from 1 to 50, preferably from 2 to 10, k can be from 0 to 24, preferably from 0 to 12, and $R^{12}$ is hydrogen, methyl or ethyl; preference is also given to unbranched bridge members $R^6$.

Examples of compounds IIa are:
a) carbonic acid derivatives (n=0), e.g. dimethyl carbonate, diethyl carbonate, dipropyl carbonate, dibutyl carbonate, ethylene carbonate, 1,2-propylene carbonate, 1,3-propylene carbonate, 1,2-butylene carbonate, 1,3-butylene carbonate, 2,3-butylene carbonate, phosgene, monomethyl chlorocarbonate, monomethyl bromocarbonate, monoethyl chlorocarbonate and monoethyl bromocarbonate. Preference is given to cyclic carbonates, of these especially to ethylene carbonate and to 1,3-propylene carbonate;
b) dicarboxylic acids (n=1, $R^4=R^5=OH$), e.g. malonic acid, succinic acid, glutaric acid, adipic acid, pimelic acid, suberic acid, azelaic acid and sebacic acid;
c) dicarboxylic acid derivatives (n=1; $R^4$, $R^5$=alkoxy, Cl, Br); examples thereof are the dimethyl, diethyl, dipropyl and dibutyl esters and also the chlorides and bromides of the dicarboxylic acids listed under b;

B) the defined carboxamides IIb, of which there may be mentioned as examples:
a) monocarboxamides (n=r=0), e.g. formamide, acetamide, propionamide, butyramide, benzamide and also the N-methyl, N-ethyl, N-propyl and N-butyl derivatives thereof;
b) dicarboxamides (m=0, n=r=1), e.g. malonamide, succinamide, glutaramide, adipamide, pimelamide, suberamide, azeleamide, sebacamide and the N,N'-dimethyl, N,N'-diethyl, N,N'-dipropyl and N,N'-dibutyl derivatives thereof;
c) ureas (n=0, r=1), e.g. urea, N-methylurea, N-ethylurea, N-propylurea, N-butylurea, N,N'-dimethylurea, N,N'-diethylurea, N,N'-dipropylurea, N,N'-dibutylurea, N-(2-ethylhexyl)urea, N-isononylurea, N-isotridecylurea, N-laurylurea, N-myristylurea, N-cetylurea, N-stearylurea, N-oleylurea, N-linolylurea, N-linolenylurea and N-phenylurea. Preference is given to monosubstituted ureas and especially to unsubstituted urea
d) bisureas (m=n=r=1), e.g. methylenediurea, ethylene-1,2-diurea, propylene-1,3-diurea, butylene-1,4-diurea, pentamethylene-1,5-diurea, hexamethylene-1,6-diurea, di(2-ureidoethyl) ether, di(3-ureidopropyl) ether, ethylene glycol bis(2-ureidoethyl) ether, ethylene glycol bis(3-ureidopropyl) ether, diethylene glycol bis(2-ureidoethyl) ether, triethylene glycol bis(2-ureidoethyl) ether and tetraethylene glycol bis(2-ureidoethyl) ether. Preference is given to bisureas having an alkylene bridge $R^6$ of from 4 to 10 carbon atoms, especially hexamethylene-1,6-diurea;

C) an epihalohydrin IIc, where X is chlorine or bromine. Preference is given to epichlorohydrin;

D) the defined monofunctional compounds IId, of which there may be mentioned as examples:
a) isocyanates, e.g. methyl isocyanate, ethyl isocyanate, propyl isocyanate, butyl isocyanate, 2-ethylhexyl isocyanate, isononyl isocyanate, isotridecyl isocyanate, lauryl isocyanate, myristyl isocyanate, cetyl isocyanate, stearyl isocyanate, oleyl isocyanate, linolyl isocyanate, linolenyl isocyanate, phenyl isocyanate, o-, m- or p-chlorophenyl isocyanate and o-, m- or p-tolyl isocyanate;
b) urethanes, e.g. methyl carbamate, ethyl carbamate, propyl carbamate, butyl carbamate and also the N-methyl, N-ethyl, N-propyl and N-butyl derivatives thereof;
c) glycidyl ethers, e.g. methyl glycidyl ether, ethyl glycidyl ether, propyl glycidyl ether, butyl glycidyl ether, (2-ethylhexyl) glycidyl ether, isononyl glycidyl ether, isodecyl glycidyl ether, isotridecyl glycidyl ether, lauryl glycidyl ether, myristyl glycidyl ether, cetyl glycidyl ether, stearyl glycidyl ether, oleyl glycidyl ether, linolyl glycidyl ether, linolenyl glycidyl ether, cyclohexyl glycidyl ether, glycidyl ethers of $C_{13}$-$C_{15}$ oxo process alcohol, $C_{12}$-$C_{14}$ fatty alcohol and also $C_{16}$-$C_{18}$ fatty alcohol, and phenyl glycidyl ether;

E) the defined bifunctional compounds IIe in which $R^{10}$ is alkylene or from 1 to 50 carbon atoms, preferably of from 2 to 26 carbon atoms, which may be interrupted by one or more nonadjacent oxygen atoms and/or contain one or more nonvicinal hydroxyl groups. The bridge member $R^{10}$ may be in particular the group

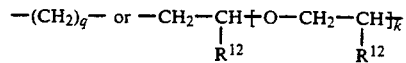

where q is from 1 to 50, preferably from 2 to 10, k is from 0 to 24, preferably from 0 to 12, and $R^{12}$ is hydrogen, methyl or ethyl; preference is also given to unbranched $R^{10}$.

Examples of compounds IIe are:

a) dichlorides or dibromides, e.g. methylene chloride, 1,2-dichloroethane, 1,3-dichloropropane, 1,4-dichlorobutane, 1,5-dichloropentane, 1,6-dichlorohexane, di-2-chloroethyl ether, di-2-chloropropyl ether, ethylene glycol bis(2-chloroethyl) ether, ethylene glycol bis(3-chloropropyl) ether, diethylene glycol bis(2-chloroethyl) ether, triethylene glycol bis(2-chloroethyl) ether, 1,3-dichloro-2-propanol, di(3-chloro-2-hydroxypropyl) ether, ethylene glycol bis(3-chloro-2-hydroxypropyl) ether, diethylene glycol bis(3-chloro-2-hydroxypropyl) ether, triethylene glycol bis(3-chloro-2-hydroxypropyl) ether, neopentylene glycol bis (3-chloro-2-hydroxypropyl-) ether, and the corresponding bromine compounds;

b) diisocyanates, e.g. ethylene 1,2-diisocyanate, propylene 1,3-diisocyanate, butylene 1,4-diisocyanate, pentamethylene 1,5-diisocyanate, hexamethylene 1,6-diisocyanate, di(2-isocyanatoethyl) ether, di(3-isocyanatopropyl) ether, ethylene glycol bis(3-isocyanatopropyl) ether, diethylene glycol bis(2-isocyanatoethyl) ether, triethylene glycol bis(2-isocyanatoethyl) ether and tetraethylene glycol bis(2-isocyanatoethyl) ether;

c) bisurethanes, e.g. the dimethyl, diethyl, dipropyl and dibutyl esters of ethylene-1,2-dicarbamic acid, propylene-1,3-dicarbamic acid, butylene-1,4-dicarbamic acid, pentamethylene-1,5-dicarbamic acid, hexamethylene-1,6-dicarbamic acid, di[(carboxyamino)ethyl]ether,di[3-(carboxyamino)propyl] ether, ethylene glycol bis[2-(carboxyamino)ethyl] ether, ethylene glycol bis[3-(carboxyamino)propyl] ether, diethylene glycol bis[2-(carboxyamino)ethyl] ether, triethylene glycol bis[2-(carboxyamino)ethyl] ether and tetraethylene glycol bis[2-(carboxyamino)ethyl] ether;

d) bisglycidyl ethers, e.g. ethylene glycol bisglycidyl ether, propane-1,3-bisglycidyl ether, butane-1,4-diol bisglycidyl ether, pentane-1,5-diol bisglycidyl ether, hexane-1,6-diol bisglycidyl ether, diethylene glycol bisglycidyl ether, di[3-(glycidyloxy)propyl] ether, triethylene glycol bisglycidyl ether, ethylene glycol bis[3-(glycidyloxy)propyl] ether, tetraethylene glycol bisglycidyl ether, pentaethylene glycol bisglycidyl ether, hexaethylene glycol bisglycidyl ether and neopentylene glycol bisglycidyl ether;

e) c-alkoxy- or c-aryloxy-propylene halohydrides, e.g. [3-chloro-2-hydroxypropyl] methyl ether, [3-chloro-2-hydroxypropyl] ethyl ether, [3-chloro-2-hydroxypropyl] propyl ether, [3-chloro-2-hydroxypropyl] butyl ether, [3-chloro-2-hydroxypropyl] ethylhexyl ether, [3-chloro-2hydroxypropyl] isononyl ether, [3-chloro-2-hydroxypropyl] isotridecyl ether, [3-chloro-2-hydroxypropyl] lauryl ether, [3-chloro-2-hydroxypropyl] myristyl ether, [3-chloro-2-hydroxypropyl] palmityl ether, [3-chloro-2-hydroxypropyl] stearyl ether, [3-chloro-2-hydroxypropyl] oleyl ether, [3-chloro-2-hydroxypropyl] linolyl ether, [3-chloro-2-hydroxypropyl] linolenyl ether and [3-chloro-2-hydroxypropyl] phenyl ether and the corresponding bromine compounds.

If the precondensate of triethanolamine is to be modified with a component II, the reaction is preferably carried out with a urea IIb (n=0, r=1), a bisurea IIb (m=n=r=1) or a cyclic carbonate IIa ($R^4$-$R^5$32 O-alkylene-O, n=0) at from 100° to 210° C., preferably from 140° to 200° C., without solvent to a viscosity of from 20,000 to 300,000 mPa.s, preferably from 28,000 to 150,000 mPa.s, or with an epihalohydrin IIc without use of a solvent at from 40° to 150° C., preferably from 60° to 130° C., or in an at least 40% strength by volume aqueous or aqueous-alcoholic solution at from 40° to 100° C. to a viscosity of an 80% strength by weight aqueous solution at 20° C. of from 12,000 to 40,000 mPa.s, preferably from 15,000 to 36,000 mPa.s.

If the precondensate of triisopropanolamine is to be modified with a component II, the reaction is preferably carried out with a urea IIb (n=0, r=1), a bisurea IIb (m=n=r=1) or a cyclic carbonate IIa ($R^4$-$R^5$=O-alkylene-O, n=0) at from 100° to 210° C., preferably from 140° to 200° C., without a solvent to a viscosity of more than 500,000 mPa.s, or with an epihalohydrin IIc without the use of a solvent at from 40° to 150° C., preferably from 60° to 130° C., or in an at least 40% strength by volume aqueous or aqueous-alcoholic solution at from 40° to 100° C.

If a precondensate of a mixture of triethanolamine and triisopropanolamine, preferably in a molar ratio of 1:1, is to be modified for the component II, the reaction is carried out for example with a urea IIb (n=0, r=1), a bisurea IIb (m=n=r=1) or a cyclic carbonate IIa ($R^4$-$R^5$=O-alkylene-O, n=0) at from 100° to 210° C., preferably from 140° to 200° C., without a solvent to a viscosity of more than 300,000 mPa.s.

The condensates of one or more trialkanolamines, or reaction products of the polyaminoether precondensates and the compounds IIa to IIe, are then reacted with from 25 to 100 mol %, preferably from 60 to 95 mol %, of one or more benzyl halides III of the type defined.

Preference is given to p-monosubstituted benzyl chlorides (X=Cl, p=1), but particular preference is given to unsubstituted benzyl chloride (X=Cl, p=0).

The benzyl halide reacts chiefly at the central nitrogen atom of the condensation products of the polyaminoethers and the compounds IIa to IIe to give a quaternized nitrogen atom.

The reaction with the benzyl halide is preferably carried out in an aqueous or aqueous-alcoholic medium at from 60° to 100° C., but it may also be carried out at higher temperatures within a shorter reaction time, in which case, however, it is necessary to employ superatmospheric pressure. The aqueous or aqueous-alcoholic solutions of the quaternized products can be used directly for the method of treating leather according to the present invention.

The quaternized condensation products described can be used for treating all customary types of leather, for example box leather, buffed box leather, glazed kid leather, suede leather, shoe sole leather, lining leather, buckskin leather, nappa leather, bag and upholstery leather or saddle and military leather, which have been dyed with the customary dyes by customary methods.

Suitable leather dyes are in particular:

anionic dyes such as direct and acid dyes, e.g. azo dyes, polyazo dyes, anionic phthalocyanine dyes, anthraquinone dyes or triphendioxazine dyes, metal complex dyes, for example 1:1, 1:2 and 2:1 dyes with chromium, copper, cobalt, nickel or iron as metal, reactive dyes, and basic or cationic dyes.

The leather materials used may also have been dyed with mixtures of the dyes mentioned.

Preference is given to leather materials dyed with anionic dyes and/or with metal complex dyes.

The dyed leather materials, which in general will have been washed with water after the dyeing process, dried if desired and customarily fixed, for example with formic acid, are advantageously aftertreated with the quaternized condensation products described in an aqueous solution containing from 0.1 to 2.0% by weight, preferably from 0.2 to 1.0% by weight, of condensation product, based on the dry weight of the leather.

The aftertreatment in general is carried out at from 20° to 70° C., preferably from 30° to 60° C., in particular from 35° to 50° C. The aftertreating agent is normally left to act on the leather for from 5 to 100 min., preferably from 10 to 50 min. The aftertreatment is effected for example by drumming. The liquor ratio, i.e. the percentage weight ratio of the aqueous treatment liquor to the leather, is customarily from 30 to 500%, based on the dry weight of the leather.

Of particular interest are so aftertreated leather materials in the shoe industry, in leather clothing and in the manufacture of leather upholstery articles, since here the dyed leather is most exposed to moisture and perspiration.

The advantage of using the above-described quaternized condensation products according to the present invention lies in the main in the distinct increase in the perspiration fastness properties compared with that achieved using customary leather fixing and aftertreating agents. Also, the other fastness properties of the leather are not significantly impaired; in particular the light fastness properties are hardly affected, if at all.

It is a further advantage that the aftertreating agents used according to the present invention are free of formaldehyde, which is naturally always present in small amounts in the still widely used urea-formaldehyde condensation products.

Furthermore, the aftertreating agents used according to the present invention have good dyeing properties. They have a high degree of exhaustion, they do not impair the levelness of the dyeing or affect the shade, for example by lightening or shifting the hue, and they prove to be highly effective even in small quantities.

EXAMPLES 1 TO 5

A quaternized condensation product prepared according to Synthesis Example 1 of reference (3) from a triethanolamine precondensate having a viscosity of 20,000 mPa.s by reaction with 5 mol % of urea and 80 mol % of benzyl chloride was adjusted with water to a strength of 30% by weight and used for aftertreating dyed leather as described hereinafter.

A conventionally produced chrome-tanned upholstery cow hide leather 1.2 mm in thickness was dyed with one of the leather dyes listed in the table below by a conventional method and fatliquored with a conventional fatliquoring composition. Then the leather was washed with 300% by weight of water at 40° C. for 10 min. and, after the washliquor had been dropped, fixed for 10 min. with 0.3% by weight of formic acid and 300% by weight of water at 40° C. 0.8% by weight of quaternized condensation product was then added, and the leather was drummed at 40° C. for 30 min. Finally, the leather was finished in a conventional manner.

The perspiration fastness was tested in accordance with IUF standard 426. In this test, the leather is impregnated with an artificial alkaline perspiration solution together with an adjacent wool/cotton blend fabric, and leather and fabric are pressed together. Thereafter the leather and the fabric are dried and the color change of the leather and the staining of the adjacent fabric are assessed against gray scales (IUF standards 131 and 132, ISO standard 105-A03). The perspiration fastness rating incorporates the rating of the staining of the adjacent textile material. The following table shows the results of the tests:

| Example | Dye Colour Index name | Dye class | Rating* of perspiration fastness | |
|---|---|---|---|---|
| | | | Aftertreatment with quaternized condensation product (according to the present invention) | without aftertreatment (for comparison) |
| 1 | Acid Blue 254 | Copper phthalocyanine dye | 4–5 | 1 |
| 2 | Acid Brown 75 | Trisazo dye | 3–4 | 3 |
| 3 | Acid Brown 161 | Copper complex dye | 4–5 | 3 |
| 4 | Acid Red 283 | Disazo dye | 3 | 2 |
| 5 | Acid Brown 422 | Cobalt complex dye | 4 | 3 |

*best = 5, worst = 1

We claim:

1. A process for aftertreating dyed leather, which comprises treating dyed leather with a quaternized condensation product of A) a precondensate of one or more trialkanolamines of the formula I

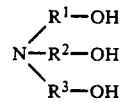

where $R^1$, $R^2$ and $R^3$ are each 1,2-alkylene of from 2 to 4 carbon atoms, and B) from 0 to 30 mol % per mole of I of one of the following compounds II:

a) a carboxylic acid or carboxylic acid derivative of the formula IIa

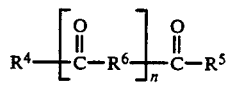

where n is 0 or 1, $R^4$ and $R^5$ are hydroxyl, except if n is 0, or $C_1$-$C_8$-alkoxy, which may be joined together in the case of n=0 to form a five- or six-membered ring, or chlorine or bromine, and $R^6$ is alkylene of from 1 to 50 carbon atoms which may be interrupted by one or more nonadjacent oxygen atoms, b) a carboxamide of the formula IIb

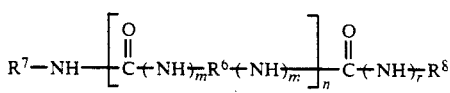   IIb where m, n and r are each 0 or 1, $R^7$ is hydrogen or $C_1$-$C_4$-alkyl, and $R^8$ is hydrogen, $C_1$-$C_{25}$-alkyl, $C_2$-$C_{25}$-alkenyl, or phenyl which may be substituted by $C_1$-$C_4$-alkyl, $C_1$-$C_4$-alkoxy, fluorine, chlorine or by bromine, c) an epihalohydrin of the formula IIc

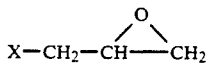

where X is chlorine or bromine, d) a monofunctional compound of the formula IId

   IId where $R^9$ is $C_1$-$C_{25}$-alkyl, $C_2$-$C_{25}$-alkenyl, or phenyl which may be substituted by $C_1$-$C_4$-alkyl, $C_1$-$C_4$-alkoxy, fluorine, chlorine or by bromine, and Y is isocyanate or either of the groups

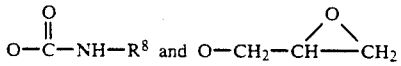

or e) a bifunctional compound of the formula IIe

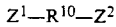   IIe where $R^{10}$ is alkylene of from 1 to 50 carbon atoms which may be interrupted by one or more nonadjacent oxygen atoms or contain one or more nonvicinal hydroxyl groups, and $Z^1$ and $Z^2$ are each chlorine, bromine, isocyanate or one of the groups

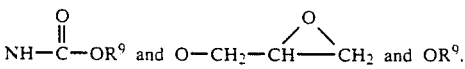

or a mixture of compounds IIa to IIe, and

C) from 25 to 100 mol % per mole of I of a benzyl halide of the formula III

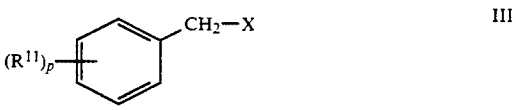

where p is from 0 to 2 and $R^{11}$ is $C_1$-$C_4$-alkyl, $C_1$-$C_4$-alkoxy, fluorine, chlorine or bromine.

2. A process as claimed in claim 1, wherein the $R^1$, $R^2$ and $R^3$ of trialkanolamine I are identical, each being 1,2-ethylene or 1,2-propylene.

3. A process as claimed in claim 1, wherein the quaternized condensation product contains from 1 to 30 mol % per mole of I of a component B.

4. A process as claimed in claim 1, wherein the viscosity of the precondensate used is within the range from 5,000 to 35,000 mPa.s if $R^1=R^2=R^3=$ethylene.

5. A process as claimed in claim 1, wherein the viscosity of the precondensate used is within the range from 100,000 to 600,000 mPa.s if $R^1=R^2=R^3=$1,2-propylene.

6. A process as claimed in claim 1, wherein compound II is one of the following substances:

| | |
|---|---|
| Urea | (IIb, $R^7=R^8=$H, n=0, r=1) |
| Hexamethylene-1,6-diurea | (IIb, $R^6=(CH_2)_6$, $R^7=R^8=$H, m=n=r=1) |
| Epichlorohydrin | (IIc, X=Cl) |
| Ethylene carbonate | (IIa, $R^4-R^5=$O—$CH_2CH_2$—O, N=0) |
| 1,3-propylene carbonate | (IIa, $R^4-R^5=$O—$CH_2CH_2CH_2$—O). |

7. A process as claimed in claim 1, wherein compound III is benzyl chloride (X=Cl, p=0).

* * * * *